(12) United States Patent
Taniguchi et al.

(10) Patent No.: US 6,839,104 B2
(45) Date of Patent: Jan. 4, 2005

(54) COMMON ELECTRODE SUBSTRATE AND LIQUID CRYSTAL DISPLAY DEVICE HAVING THE SAME

(75) Inventors: Yoji Taniguchi, Kawasaki (JP); Hiroyasu Inoue, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 216 days.

(21) Appl. No.: 09/923,076

(22) Filed: Aug. 6, 2001

(65) Prior Publication Data

US 2002/0060764 A1 May 23, 2002

(30) Foreign Application Priority Data

Nov. 22, 2000 (JP) ........................................ 2000-356218

(51) Int. Cl.[7] ..................... G02F 1/1335; G02F 1/1333
(52) U.S. Cl. ...................... 349/106; 349/110; 349/111; 349/123; 349/128; 349/130; 349/141
(58) Field of Search ................................ 349/130, 111, 349/110, 123, 128, 141, 142, 143, 144, 106, 139

(56) References Cited

U.S. PATENT DOCUMENTS

| | | | | |
|---|---|---|---|---|
| 3,967,883 A | * | 7/1976 | Meyerhofer et al. | 349/129 |
| 4,878,742 A | * | 11/1989 | Ohkubo et al. | 349/201 |
| 6,424,397 B1 | * | 7/2002 | Kuo | 349/139 |
| 6,545,658 B2 | * | 4/2003 | Ohta et al. | 345/98 |
| 6,567,144 B1 | * | 5/2003 | Kim et al. | 349/128 |
| 6,583,837 B1 | * | 6/2003 | Fukumoto et al. | 349/129 |
| 6,600,539 B2 | * | 7/2003 | Song | 349/130 |
| 6,600,540 B2 | * | 7/2003 | Yamakita et al. | 349/139 |

FOREIGN PATENT DOCUMENTS

| | | |
|---|---|---|
| EP | 0 884 626 | 12/1998 |
| JP | 11-242225 | 9/1998 |

* cited by examiner

Primary Examiner—Long Pham
Assistant Examiner—Shrinivas Rao
(74) Attorney, Agent, or Firm—Greer, Burns & Crain, Ltd.

(57) ABSTRACT

A common electrode substrate has a transparent insulating substrate to be arranged opposite to an array substrate having pixel electrodes formed in respective pixel regions that are defined by a plurality of gate bus lines and drain bus lines. The substrate holds a liquid crystal having negative dielectric anisotropy. A common electrode is formed on the transparent insulating substrate; alignment regulating structures having linear protrusions are formed on the common electrode; and a light shield film is formed on the transparent insulating substrate with overlap regions that overlap the pixel electrodes when viewed in the direction perpendicular to a surface of the transparent insulating substrate, so as to shield, from light, alignment defective regions of the liquid crystal formed in regions of end portions of the pixel electrodes.

20 Claims, 16 Drawing Sheets

COMMON ELECTRODE SUBSTRATE AND LIQUID CRYSTAL DISPLAY DEVICE HAVING THE SAME

BACKGROUND OF THE INVENTION

1. Field of the Invention

The present invention relates to a common electrode substrate that is opposed to an array substrate as well as to a liquid crystal display device having the substrate.

2. Description of the Related Art

Liquid crystal display devices have a liquid crystal that is sealed between a pair of substrates. Each of the paired substrates has at least one electrode and an alignment film. TN (twisted nematic) mode liquid crystal display devices, which are widely used conventionally, have horizontal alignment films and a liquid crystal having positive dielectric anisotropy. Liquid crystal molecules are aligned approximately parallel with the horizontal alignment film when a voltage is applied. Liquid crystal molecules rise so as to become approximately perpendicular to the horizontal alignment film when a voltage is applied to those.

While TN mode liquid crystal display devices have such advantages that they can be made thin, they have a first disadvantage of a narrow viewing angle and a second disadvantage of low contrast. A method for solving the first disadvantage and obtaining a wide viewing angle is domain division. In the domain division, each pixel is divided into two domains. In one domain, liquid crystal molecules rise or fall toward one side. In the other domain, liquid crystal molecules rise or fall toward the other side. By forming the domains having different view angle characteristics in each pixel, the view angle characteristic of the device as a whole is averaged, and a wide viewing angle can thereby be obtained.

A usual method for controlling the alignment of a liquid crystal is to rub an alignment film. In the case of the domain division, rubbing is performed in a first direction in one domain of each pixel by using a mask, and then, rubbing is performed in a second direction that is opposite to the first direction in the other domain by using a complementary mask. Alternatively, the entire alignment film is rubbed in a first direction, and then, one domain or the other domain of each pixel is selectively irradiated with ultraviolet light by using a mask to produce a difference in the pre-tilt of liquid crystal molecules between the one domain and the other domain.

Rubbing needs to be performed in liquid crystal display devices having horizontal alignment films. Failures due to pollution and static electricity that occur during the rubbing are factors of lowering the yield.

On the other hand, in VA (vertically aligned) mode liquid crystal display devices having vertical alignment films, liquid crystal molecules are aligned approximately perpendicular to the vertical alignment films when no voltage is applied. Liquid crystal molecules fall so as to become parallel with the vertical alignment films when a voltage is applied. This provides high contrast and solves the second disadvantage (low contrast) of the TN mode liquid crystal display devices. However, even in general VA mode liquid crystal display device having vertical alignment films, the alignment films are usually rubbed to control, the liquid crystal alignment.

Japanese Patent Application No. 185836/1998 of the present applicant proposes a liquid crystal display device in which the liquid crystal alignment can be controlled without rubbing. This liquid crystal display device is a VA mode liquid crystal display device having vertical alignment films and negative dielectric anisotropy. To control the liquid crystal alignment, linear alignment regulating structures (protrusions or slits) are provided on each of paired substrates.

In this specification, this type of VA mode liquid crystal display device will be hereinafter referred to as "MVA (multi-domain vertical alignment) liquid crystal display device."

The MVA liquid crystal display device has advantages that the rubbing is not necessary and domain division can be attained by arranging linear alignment regulating structures. Therefore, the MVA liquid crystal display device can provide a wide viewing angle and high contrast. Since the rubbing is not necessary, the liquid crystal display device can be manufactured easily and is free of pollution due to dust, etc. that would otherwise be scraped off alignment films during rubbing, leading to an increase of the reliability of the liquid crystal display device.

FIG. 21 is a plan view showing the basic configuration of a conventional MVA liquid crystal display device and shows one pixel and a region in its vicinity. This MVA liquid crystal display device is an active matrix type liquid crystal display device in which each pixel is provided with a thin-film transistor (TFT) 102 as a switching element.

Gate bus lines 104 extending in the right-left direction in FIG. 21 and drain bus lines 106 extending in the top-bottom direction in FIG. 21 are formed on an array substrate 122 that is provided with the TFTs 102. Each TFT 102 is constructed of a drain electrode 108 that extends from the drain bus line 106, a source electrode 110 that is opposed to the drain electrode 108, and a portion (gate electrode) of the gate bus line 104 which overlaps with the drain electrode 108 and the source electrode 110. Although not shown in FIG. 21, channel layers made of, for example, an amorphous silicon (α-Si) film, are formed on the respective gate bus lines 104. The pixel electrodes 112 that are connected to the respective source electrodes 110 are further formed on the array substrate 122. Each pixel electrode 112 is provided with slits 114 that are oblique with respect to the edges of the pixel electrode 112. The slits 114 are alignment regulating structures on the array substrate 122 side for controlling the liquid crystal alignment. Each pixel electrode 112 is provided with connecting portions 116 so as not to be separated electrically by the slits 114. Thus, the pixel electrode 112 in each pixel is electrically connected.

On a common electrode substrate 128 that is provided with a common electrode and color filters (both not shown in FIG. 21) is formed a light shield film 136 (indicated by hatching in the top-left-to-bottom-right direction) in the regions where the TFTs 102 on the array substrate 122 are formed and other regions where neither the pixel electrodes 112 nor the alignment regulating structures (slits 114 in FIG. 21) are formed. The light shield film 136 is formed to suppress leak current that is caused by light incident on the channel layer of each TFT 102, prevent leakage of light from the adjacent pixel electrodes 112, and prevent color mixing between the adjacent pixels. For these reasons, the light shield film 136 is formed in such a manner that the edges approximately coincide with the edges of the pixel electrodes 112 when viewed in the direction perpendicular to the surfaces of the common electrode substrate 128. On the common electrode substrate 128 is also formed protrusions 118, which are the alignment regulating structures together with the slits 114 that are formed on the opposite array substrate 122.

For example, in the case of an XGA liquid crystal display device (LCD panel) having a diagonal size of 15 inches, each pixel measures 99 μm×297 μm. The width of the slits 114 and the protrusions 118 is 10 μm, and the interval between the slits 114 and the protrusions 118 is 25 μm when viewed in the direction parallel with the substrate surfaces. Further, the width of the connecting portions 116 of the pixel electrodes 112 is 4 μm, and the distance between the end portions of the drain bus lines 106 and the edges of the pixel electrodes 112 is 7 μm.

FIGS. 22 to 24, which are simplified sectional views taken along line E—E in FIG. 21, show functions of the slits 114 and the protrusions 118 that are the alignment regulating structures for controlling the liquid crystal alignment. FIG. 22 shows a state of the liquid crystal when no voltage is applied between the pair of substrates 122 and 128. In the array substrate 112 side, the pixel electrodes 112 are formed on a glass substrate 120, and the slits 114 are formed on the pixel electrode 112. Moreover, an alignment film (vertical alignment film) 126 is formed so as to cover the pixel electrodes 112 and the slits 114. On the other hand, in the common electrode substrate 128 side, the common electrode 124 is formed on the entire surface of the glass substrate 120 so as to be opposed to the pixel electrodes 112. The protrusions 118 made of an insulator (dielectric) such as a resist are formed on the common electrode 124. Moreover, an alignment film 126 is formed so as to cover the common electrode 124 and the protrusions 118.

A liquid crystal LC is sealed between the array substrate 122 and the common electrode substrate 128. Liquid crystal molecules (indicated by ellipses in FIG. 22) are aligned perpendicular to the alignment films 126. Therefore, the liquid crystal molecules are also aligned perpendicular to the alignment films 126 which are formed on the surfaces of the protrusions 118, and the liquid crystal molecules in the vicinity of the surfaces of the protrusions 118 are inclined against the glass substrate 120. However, strictly, the liquid crystal molecules in the vicinity of the protrusions 118 are not aligned perpendicular to the alignment films 126. In the regions where the protrusions 118 are not formed, the liquid crystal molecules are aligned approximately perpendicular to the glass substrates 120 by the alignment films 126. Because of the continuity of the liquid crystal, the liquid crystal molecules in the vicinity of the surface of each protrusion 118 follow the liquid crystal molecules located in the major part of the pixel, and hence, are inclined from the direction perpendicular to the alignment film 126 toward the normal to the glass substrate 120. Although not shown in FIG. 22, a pair of polarizers are disposed outside the glass substrates 120 of the array substrate 122 and of the common electrode substrate 128 in the crossed Nicols state. Therefore, black display is obtained when no voltage is applied.

FIG. 23 shows equipotential lines when voltages are applied between the electrodes of the pair of substrates. FIG. 24 shows a state of the liquid crystal in this condition. As indicated by equipotential lines (broken lines in FIG. 23), when voltages are applied between the pixel electrodes 112 and the common electrode 124, electric field distributions in the regions where the slits 114 or the protrusions 118 are formed differ from those in the other regions. This is because in each region where the slit 114 is formed, oblique electric fields are formed toward the common electrode 124 opposed from the end portions of the pixel electrode 112, and in each region where the protrusion 118 is formed, the electric field is distorted because the protrusion 118 is a dielectric formed on the common electrode 124. Therefore, as shown in FIG. 24, liquid crystal molecules fall in directions indicated by arrows in FIG. 24, that is, in such directions as to become perpendicular to the electric field directions, in accordance with the magnitude of the electric field. White display is thus obtained when voltages are applied.

Where the linear protrusions 118 are formed in a linear state as shown in FIG. 21, the liquid crystal molecules in the vicinity of each protrusion 118 fall in two directions that are approximately perpendicular to the direction where the protrusion 118 is provided, with the protrusion 118 being as the boundary. Since liquid crystal molecules in the vicinity of each protrusion 118 are slightly inclined from the direction perpendicular to the glass substrate 120 even when no voltage is applied, they fall quickly in response to the electric field. Nearby the liquid crystal molecules also fall quickly following the behavior of the liquid crystal molecules in the vicinity of the protrusion 118 while being influenced by the electric field. Similarly, where the slits 114 are provided in a linear state as shown in FIG. 21, the liquid crystal molecules in the vicinity of each slit 114 fall in two directions that are approximately perpendicular to the direction where the slit 114 is provided, with the slit 114 being as the boundary.

In this manner, in the region between two dash and dotted lines in FIG. 22, the liquid crystal molecules fall in the same direction, that is, they are aligned in the same direction. This is a region that is denoted by symbol [A] in FIG. 21. As denoted by symbols [A] to [D] in FIG. 21 in a typified manner, in the MVA liquid crystal display device, the four regions having different alignment directions are formed in each pixel, whereby a feature of a wide viewing angle is obtained. The above alignment control using the alignment regulating structures is not limited to the case of the combinations of the slits 114 and the protrusions 118 shown in FIGS. 21 to 24; a similar alignment control can be performed by using, as the alignment regulating structures, the combination of protrusions and protrusions or the combination of slits and slits.

Although the MVA liquid crystal display device provides a wide viewing angle, it had a problem that there exist regions where the alignment of liquid crystal molecules is not stable, resulting in lowering the luminance. That is, when voltages are applied between the electrodes, alignment defective regions 130 occur as hatched in FIG. 21. The alignment defective regions 130, where the light transmittance is low, are a factor of lowering the luminance in white display. The alignment defective regions 130 occur along the drain bus lines 106 on the side where the alignment regulating structures (protrusions 118 in FIG. 21) that are provided on the common electrode substrate 128 form obtuse angles with the edges of each pixel electrode 112 when viewed in the direction perpendicular to the substrate surfaces. In the alignment defective regions 130, the liquid crystal molecules have different alignment directions from the alignment directions that are controlled by the alignment regulating structures (protrusions 118 and slits 114 in FIG. 21) that are provided in the pair of substrates.

FIG. 25 is a plan view showing an MVA liquid crystal display device that solves the above problem and, more specifically, shows one pixel and a region in its vicinity. The components in FIG. 25 having the same functions as the corresponding components in FIG. 21 are given the same reference symbols as the latter and will not be described below. The MVA liquid crystal display device of FIG. 25 has auxiliary protrusions 132 that are alignment regulating structures for performing a strong alignment control in the alignment defective regions 130 shown in FIG. 21. The auxiliary protrusions 132 branch off the protrusions 118 and are formed along the end portions of each pixel electrode 112, that is, the drain bus lines 106. By virtue of the auxiliary protrusions 132, liquid crystal molecules (indicated by cylinders in FIG. 25) a are aligned continuously with liquid crystal molecules b, whereby the alignment of liquid crystal molecules is made stable in the alignment defective regions 130.

FIG. 26 shows a display area in which a band-like black figure that is long in the top-bottom direction in FIG. 26 (hereinafter referred to as "black vertical band") is displayed against a white background on the conventional MVA liquid crystal display device of FIG. 25. In a display area 134, pixel A that is part of the background displays white, and pixel B in the black vertical band displays black. Although pixel C that is located under the black vertical band in FIG. 26 displays white, it is darker than pixel A. Pixel C becomes more darker than pixel A as the black vertical band becomes longer in the vertical direction in FIG. 26. As described above, the conventional MVA liquid crystal display device of FIG. 25 has the problem that when a black vertical band is displayed against a white background, a region displaying white under the black vertical band is displayed darker than the other region displaying white.

Similarly, FIG. 27 shows a display area in which a band-like white figure that is long in the top-bottom direction in FIG. 26 (hereinafter referred to as "white vertical band") is displayed against a black background on the conventional MVA liquid crystal display device of FIG. 25. In the display area 134, pixel A that is part of the background displays black, and pixel B in the white vertical band displays white. Although pixel C that is located under the white vertical band in FIG. 26 displays black, it is brighter than pixel A. Pixel C becomes more brighter than pixel A as the white vertical band becomes longer in the vertical direction in FIG. 26. As described above, the conventional MVA liquid crystal display device of FIG. 25 has the problem that when a white vertical band is displayed against a black background, a region displaying black under the white vertical band is displayed brighter than the other region displaying black. In the following, the above-described phenomenon that pixel C and its vicinity become brighter or darker than pixel A and its vicinity will be referred to as "vertical crosstalk." The vertical crosstalk occurs in such a manner that horizontal electric fields that develop between the drain bus lines 106 and end portions of each pixel electrode 112 where the auxiliary protrusions 132 are not formed influence the alignment of liquid crystal molecules.

SUMMARY OF THE INVENTION

An object of the present invention is to provide a common electrode substrate capable of providing high luminance and good display characteristics as well as a liquid crystal display device having such a common electrode substrate.

The above object is attained by a common electrode substrate comprising a transparent insulating substrate to be arranged opposite to an array substrate having pixel electrodes formed in respective pixel regions that are defined by a plurality of gate bus lines and drain bus lines, and to hold a liquid crystal having negative dielectric anisotropy; a common electrode formed on the transparent insulating substrate; alignment regulating structures having linear protrusions formed on the common electrode; and a light shield film formed on the transparent insulating substrate and having overlap regions that overlap the pixel electrodes when viewed in the direction perpendicular to the surface of the transparent insulating substrate so as to shield, from light, alignment defective regions of the liquid crystal formed in regions of end portions of the pixel electrodes.

DESCRIPTION OF THE PREFERRED EMBODIMENTS

Figure 1:
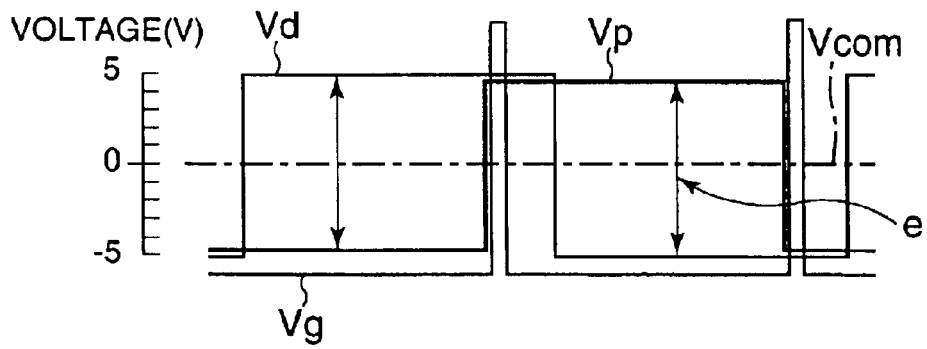
FIGS. 1 to 3 are graphs for description of the main reason for vertical crosstalk that occurs in a conventional liquid crystal display device as a basis of a first embodiment of the present invention.
Figure 2:
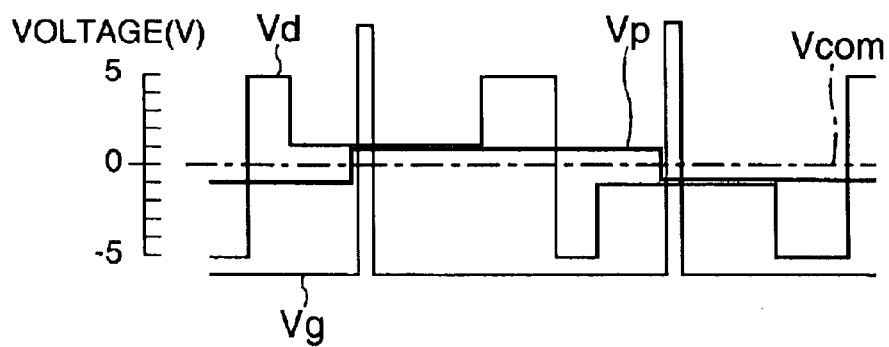
Figure 3:
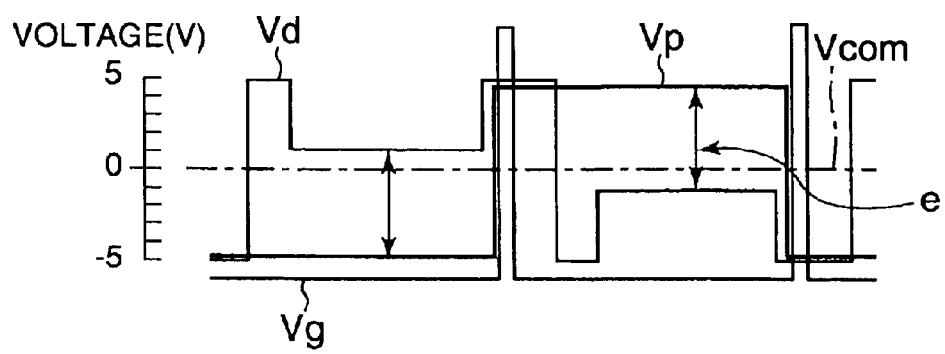
Figure 26:
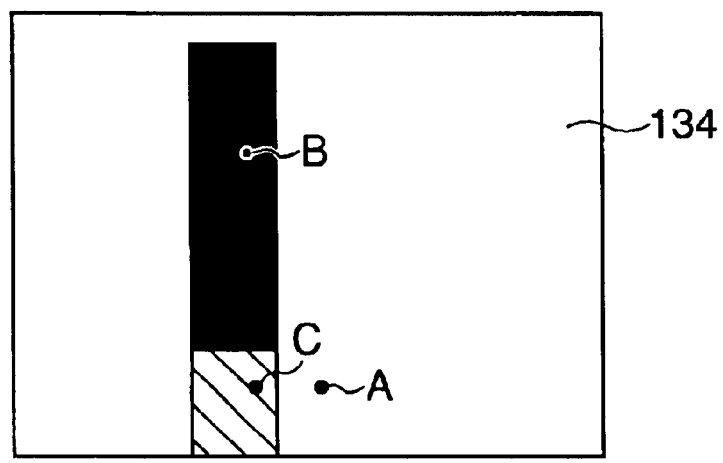
FIGS. 26 and 27 illustrate a problem of the conventional liquid crystal display device of FIG. 25.

A common electrode substrate and a liquid crystal display device having the substrate according to a first embodiment of the present invention will be hereinafter described with reference to FIGS. 1 to 18. First, the main reason for the vertical crosstalk that occurs in the conventional MVA liquid crystal display device as a basis of the first embodiment of the invention will be described with reference to FIGS. 1 to 11. FIGS. 1 to 3 are graphs showing examples of a gate voltage, a drain voltage, a pixel voltage, and a common voltage in pixels A, B, and C shown in FIG. 26, respectively. FIG. 1 shows a gate voltage $V_g$, a drain voltage $V_d$, a pixel voltage $V_p$, and a common voltage $V_{com}$ in pixel A. The abscissa represents the time and covers about two frames (e.g., about 1/30 sec) in FIG. 1. The ordinate represents the voltage (V). In FIG. 26, all the pixels on the drain bus line including pixel A display white. Therefore, the drain voltage $V_d$ becomes +5 V or −5 V every frame cycle. When the gate voltage $V_g$ is applied to the gate electrode, +5 V or −5 V of the drain voltage $V_d$ is written to pixel A as the pixel voltage $V_p$. The pixel voltage $V_p$ is held until the next frame by a storage capacitor (not shown). In this example, the common voltage $V_{com}$ is always equal to 0 V. The potential difference e between the pixel voltage $V_p$ and the drain voltage $V_d$ is equal to 10 V in most of each frame period.

FIG. 2 shows a gate voltage $V_g$, a drain voltage $V_d$, a pixel voltage $V_p$, and a common voltage $V_{com}$, in pixel B shown in FIG. 26. The abscissa of FIG. 2, which represents the time, is the same as that of FIG. 1 and covers about two frames. The ordinate represents the voltage (V). Pixel B displays black, and in FIG. 26 most of the pixels on the drain bus line including pixel B also display black. Therefore, the drain voltage $V_d$ is equal to +1 V or −1 V in most of each frame period and is equal to +5 V or −5 V in the other periods. When the gate voltage $V_g$ is applied to the gate electrode, +1 V or −1 V of the drain voltage $V_d$ is written to pixel B as the pixel voltage $V_p$.

FIG. 3 shows a gate voltage $V_g$, a drain voltage $V_d$, a pixel voltage $V_p$, and a common voltage $V_{com}$ in pixel C shown in FIG. 26. The abscissa of FIG. 3 represents the time and covers about two frames as in the cases of FIGS. 1 and 2. The ordinate represents the voltage (V). Although pixel C displays white, in FIG. 26 most of the pixels on the drain bus line including pixel C display black. Therefore, the drain voltage $V_d$ is equal to +1 V or −1 V in most of each frame period and is equal to +5 V or −5 V in the other periods. The period when the drain voltage $V_d$ is equal to +1 V or −1 V increases in proportion to the vertical length of the black vertical band. When the gate voltage $V_g$ is applied to the gate electrode, +5 V or −5 V of the drain voltage $V_d$ is written to pixel C as the pixel voltage $V_p$. The potential difference e between the pixel voltage $V_p$ and the drain voltage $V_d$ is equal to 6 V in most of each frame period and is equal to 10 V in other periods. The actual potential difference e between the pixel electrode and the drain bus line is equal to an average value of them. The actual potential difference e is approximately equal to 6 V if the vertical length of the black vertical band is long.

Figure 4:
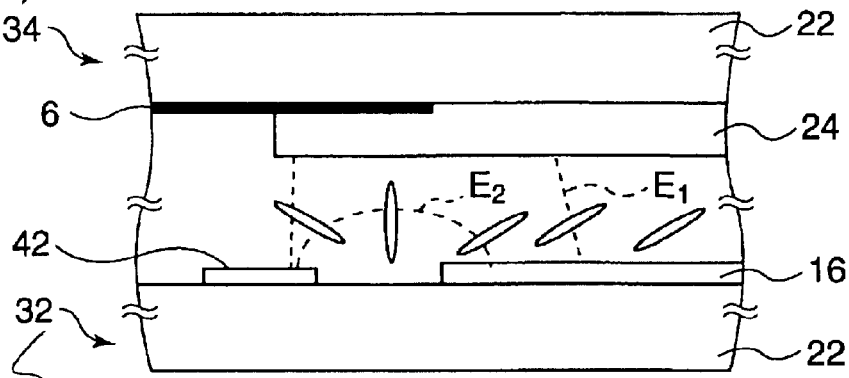
FIGS. 4 and 5 are schematic sectional views for description of the main reason for the vertical crosstalk that occurs in the conventional liquid crystal display device as a basis of the first embodiment of the invention.

The states of liquid crystal molecules in pixel A and pixel C will be described below with reference to FIGS. 4 to 6. FIG. 4 is a schematic sectional view of an end portion of a pixel electrode 16 of pixel A along a drain bus line 42. An array substrate 32 has the drain bus line 42 and the pixel electrode 16 on a glass substrate 22. A common electrode 34 that is opposed to the array substrate 32 has a light shield film 6 that is generally formed in a region where the pixel electrode 16 is not formed, and a common electrode 24 that is formed on the almost entire surface of the substrate. Vertical alignment films (not shown) for orienting liquid crystal molecules perpendicular to the two substrates 32 and 34 when no voltage is applied are formed on the opposite surfaces of the two substrates 32 and 34, respectively. A liquid crystal LC having negative dielectric anisotropy is sealed between the two substrates 32 and 34. Many of the liquid crystal molecules are inclined rightward in FIG. 4 by the electric field between the pixel electrodes 16 and the common electrode 24, whereby a white display is obtained in pixel A.

As shown in FIG. 1, in pixel A, the drain voltage $V_d$ of the drain bus line 42 becomes +5 V or −5 V every frame cycle, and the pixel voltage $V_p$ of the pixel electrode 16 is equal to −5 V or +5 V. The common voltage $V_{com}$ of the common electrode 24 is equal to 0 V. Therefore, the potential difference between the pixel electrode 16 and the drain bus line 42 is approximately equal to 10 V, and the potential difference between the pixel electrode 16 and the common electrode 24 is equal to 5 V. Broken lines in FIG. 4 indicate electric fields $E_1$ and $E_2$ that develop between the electrodes, and a relationship $|E_2|>|E_1|$ holds. That is, the horizontal electric field $E_2$ that is stronger than the electric field $E_1$ between the pixel electrode 16 and the common electrode 24 develops between the pixel electrode 16 and the drain bus line 42.

Influenced by the strong horizontal electric field $E_2$, the liquid crystal molecules between the pixel electrode 16 and the drain bus line 42 are aligned approximately perpendicular to the surfaces of the two substrates 32 and 34. However, since the light shield film 6 shields from light the region from the drain bus line 42 to the end portion of the pixel electrode 16, the alignment defect in this region does not affect the display. Further, although the liquid crystal molecules in the end portion of the pixel electrode 16 are inclined being influenced by the horizontal electric field $E_2$, this is not problematic because it displays white originally.

Figure 5:
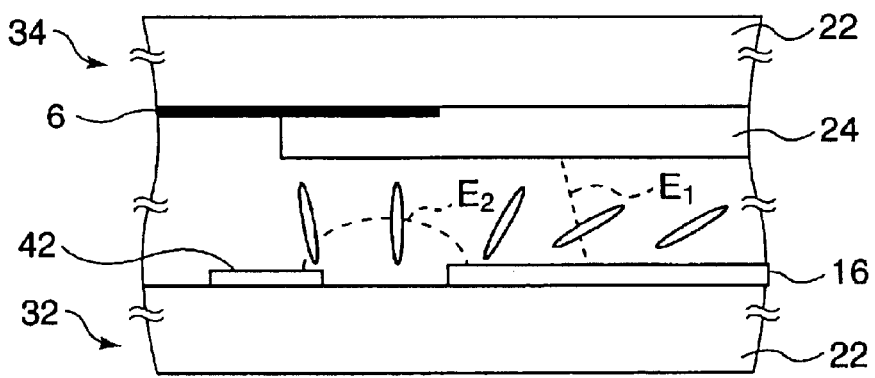
Figure 6:
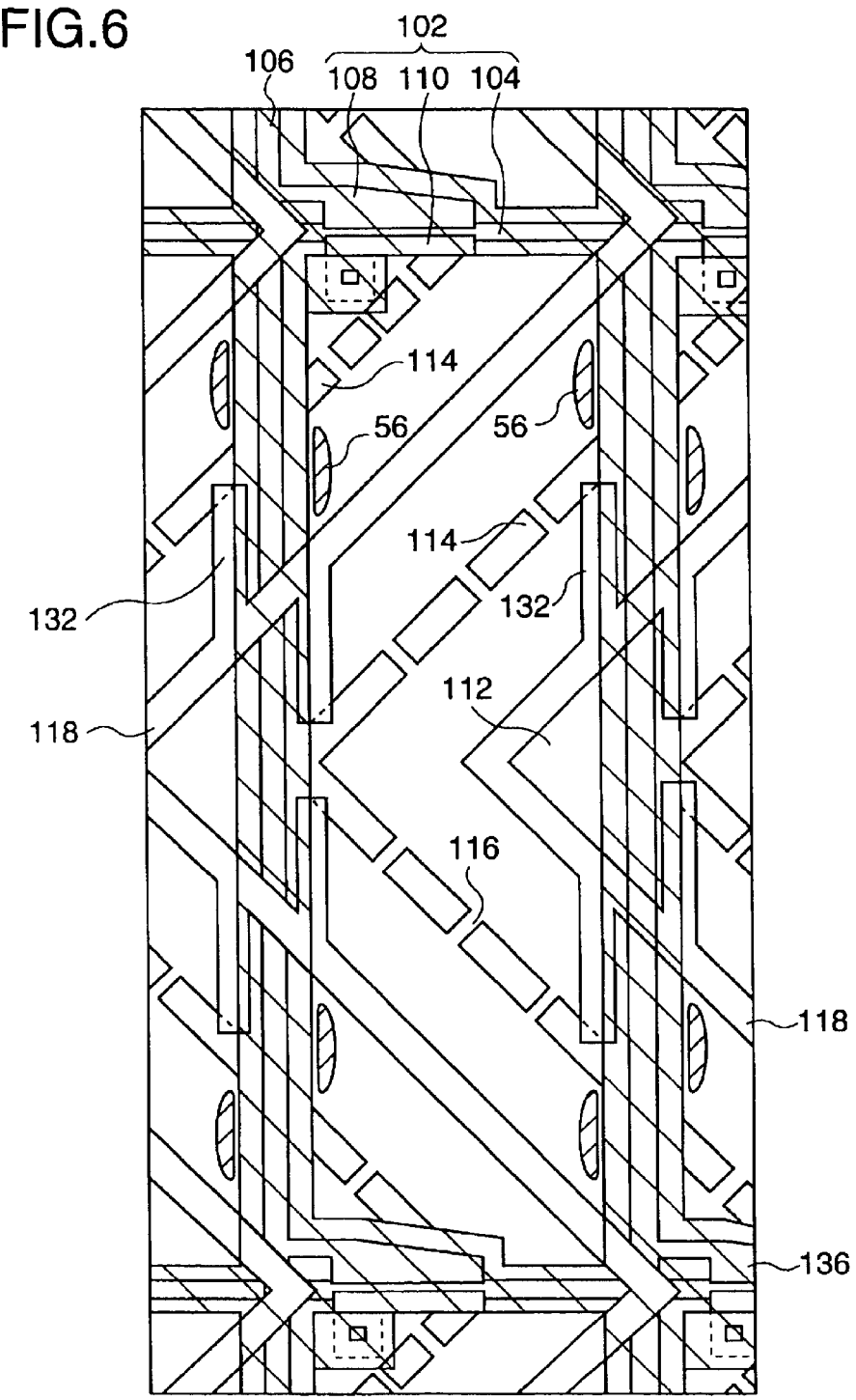
FIG. 6 is a plan view showing the configuration of the conventional liquid crystal display device as a basis of the first embodiment of the invention.

FIG. 5 is a schematic sectional view of an end portion of the pixel electrode 16 of pixel C extending along the drain bus line 42. The components in FIG. 5 having the same functions as the corresponding components in FIG. 4 are given the same reference symbols as the latter and will not be described below. As in the case of pixel A shown in FIG. 4, many of the liquid crystal molecules are inclined rightward in FIG. 5 by the electric field between the pixel electrode 16 and the common electrode 24, whereby a substantially white display is obtained in pixel C.

As shown in FIG. 3, in pixel C, the drain voltage $V_d$ of the drain bus line 42 is equal to +1 V or −1 V in most of each frame period, and the pixel voltage $V_d$ of the pixel electrode 16 is equal to +5 V or −5 V. The common voltage $V_{com}$ of the common electrode 24 is equal to 0 V. Therefore, the potential difference e between the pixel electrode 16 and the drain bus line 42 is approximately equal to 6 V, and the potential difference between the pixel electrode 16 and the common electrode 24 is equal to 5 V. Broken lines in FIG. 5 indicate electric fields $E_1$ and $E_2$ that develop between the electrodes, and a relationship $|E_2|\approx|E_1|$ holds. That is, the horizontal electric field $E_2$ that is approximately as strong as the electric field $E_1$ between the pixel electrode 16 and the common electrode 24 develops between the pixel electrode 16 and the drain bus line 42.

Figure 25:
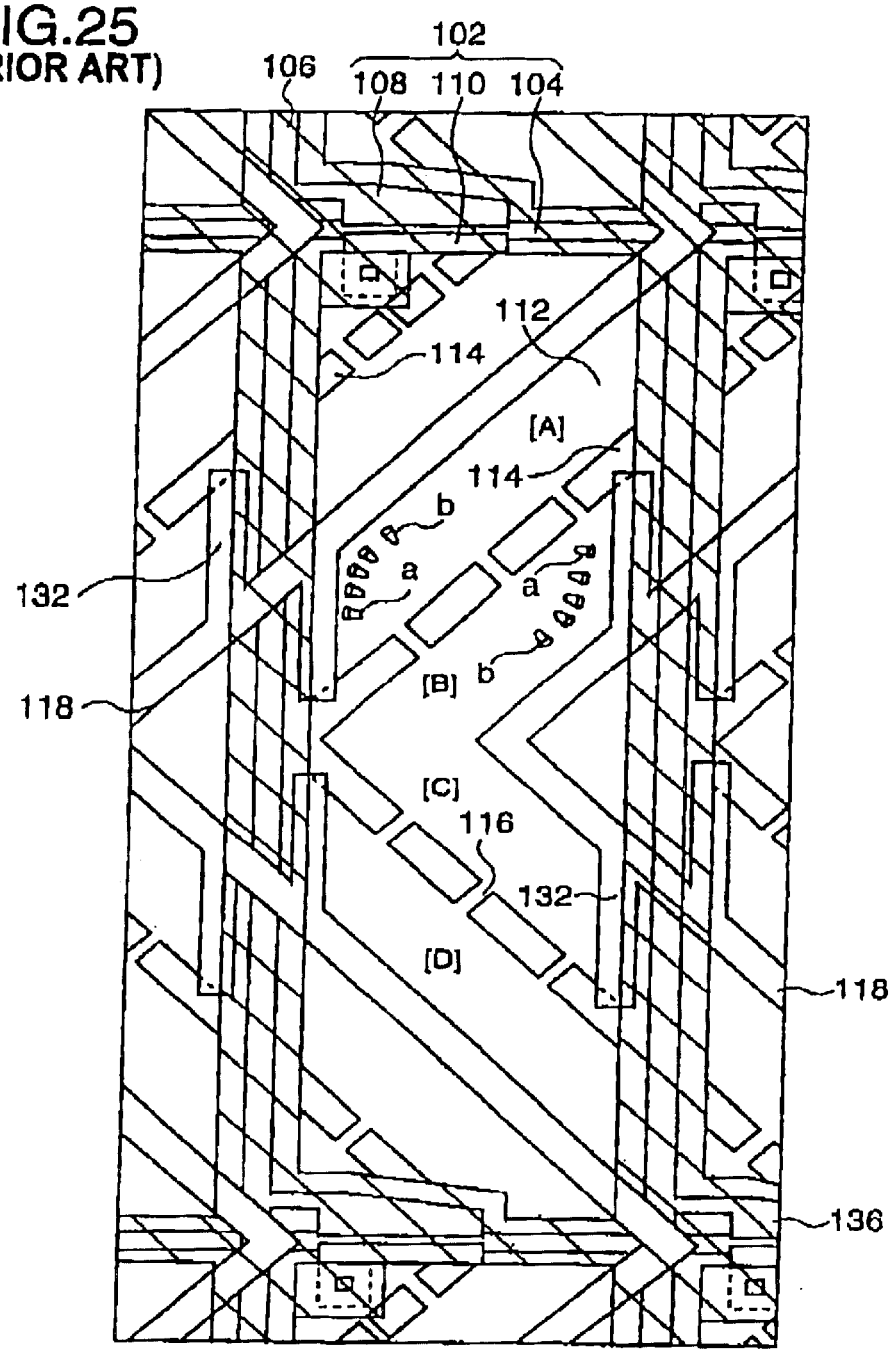
FIG. 25 is a plan view showing the configuration of another conventional liquid crystal display device.

Influenced by the horizontal electric field $E_2$, the liquid crystal molecules between the pixel electrode 16 and the drain bus line 42 are aligned approximately perpendicular to the surfaces of the two substrates 32 and 34. However, since the light shield film 6 shields from light the region from the drain bus line 42 to the end portion of the pixel electrode 16, the alignment defect in this region does not affect the display. The liquid crystal molecules in the end portion of the pixel electrode 16 are not inclined sufficiently because they are influenced by the horizontal electric field $E_2$ that is approximately as strong as the electric field $E_1$ that is perpendicular to the two substrates 32 and 34. As a result, in the end portion of the pixel electrode 16, the transmission light quantity is smaller than in the other portion of the same pixel, and hence, pixel C is displayed darker than pixel A; vertical crosstalk occurs. FIG. 6 is a plan view, similar to FIG. 25, of one pixel of the liquid crystal display device where vertical crosstalk occurs. Alignment defective regions 56 where the above-described alignment defect occurs are regions that correspond to end portions of the pixel electrode 112 extending along the drain bus lines 106 and where the auxiliary protrusions 132 are not formed.

Figure 7:
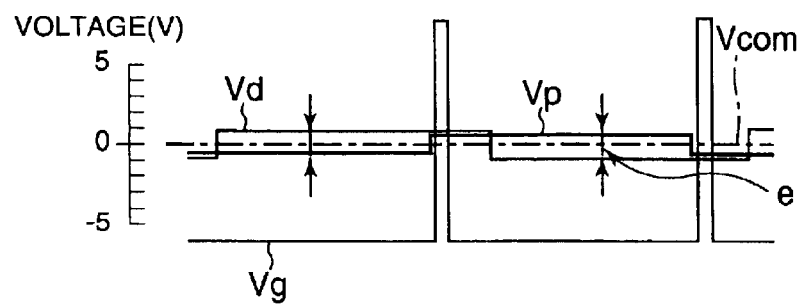
FIGS. 7 to 9 are graphs for description of the main reason for vertical crosstalk that occurs in the conventional liquid crystal display device as a basis of a first embodiment of the present invention.
Figure 8:
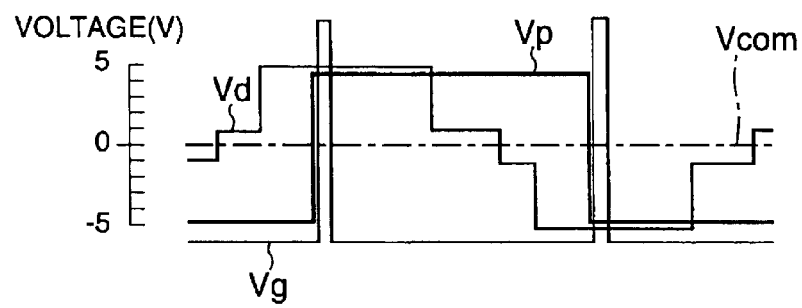
Figure 9:
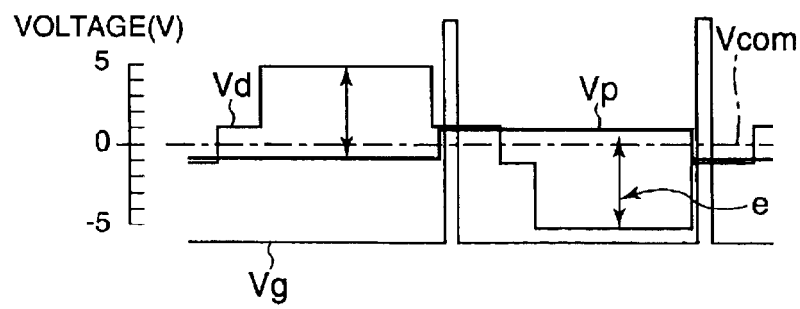
Figure 27:
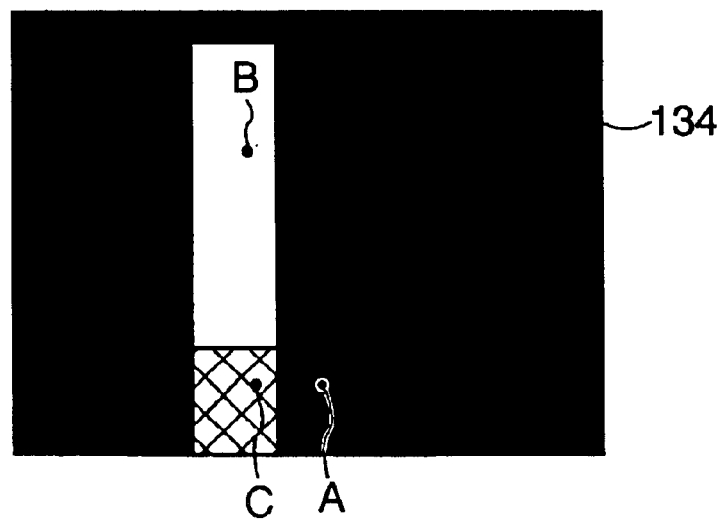

FIGS. 7 to 9 are graphs showing examples of a gate voltage, a drain voltage, a pixel voltage, and a common voltage in pixels A, B, and C shown in FIG. 27, respectively. FIGS. 7 to 9 are similar to FIGS. 1 to 3, and the abscissa represents the time and covers about two frames. The ordinate represents the voltage (V). FIG. 7 shows a gate voltage $V_g$, a drain voltage $V_d$, a pixel voltage $V_p$, and a common voltage $V_{com}$ in pixel A. In FIG. 7, since all the pixels on the drain bus line 42 including pixel A display black, the drain voltage $V_d$ becomes +1 V or −1 V every frame cycle. When the gate voltage $V_g$ is applied to the gate electrode, +1 V or −1 V of the drain voltage $V_d$ is written to pixel A as the pixel voltage $V_p$. The potential difference e between the pixel voltage $V_p$ and the drain voltage $V_d$ is equal to 2 V in most of each frame period.

FIG. 8 shows a gate voltage $V_g$, a drain voltage $V_d$, a pixel voltage $V_p$, and a common voltage $V_{com}$ in pixel B shown in FIG. 27. Pixel B displays white. In FIG. 8, since most of the pixels on the drain bus line 42 including pixel B also display white, the drain voltage $V_d$ is equal to +5 V or −5 V in most of each frame period and is equal to +1 V or −1 V in the other periods. When the gate voltage $V_g$ is applied to the gate electrode, +5 V or −5 V of the drain voltage $V_d$ is written to pixel B as the pixel voltage $V_p$.

FIG. 9 shows a gate voltage $V_g$, a drain voltage $V_d$, a pixel voltage $V_p$, and a common voltage $V_{com}$ in pixel C shown in FIG. 27. Although pixel C displays black, in FIG. 27 most of the pixels on the drain bus line 42 including pixel C display white. Therefore, the drain voltage $V_d$ is equal to +5 V or −5 V in most of each frame period and is equal to +1 V or −1 V in the other periods. The period when the drain voltage $V_d$ is equal to +5 V or −5 V increases in proportion to the vertical length of the white vertical band. When the gate voltage $V_g$ is applied to the gate electrode, +1 V or −1 V of the drain voltage $V_d$ is written to pixel C as the pixel voltage $V_p$. The potential difference e occurred between the pixel voltage $V_p$ and the drain voltage $V_d$ is equal to 6 V in most of each frame period and is equal to 2 V in other periods. The actual potential difference e between the pixel electrode 16 and the drain bus line 42 is equal to an average value of them. The actual potential difference e is approximately equal to 6 V if the vertical length of the white vertical band is long.

Figure 10:
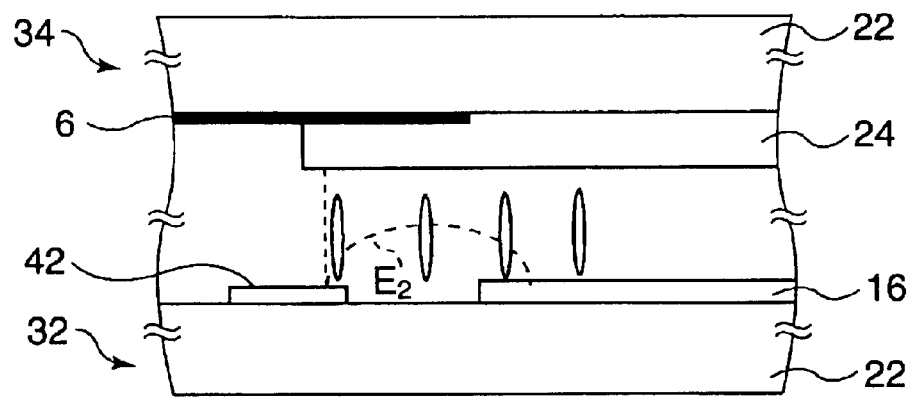
FIGS. 10 and 11 are schematic sectional views for description of the main reason for the vertical crosstalk that occurs in the conventional liquid crystal display device as a basis of the first embodiment of the invention.

The states of liquid crystal molecules in pixel A and pixel C will be described below with reference to FIGS. 10 and 11. FIG. 10 is a schematic sectional view of an end portion of the pixel electrode 16 of pixel A extending along the drain bus line 42. The components in FIG. 10 having the same functions as the corresponding components in FIG. 4 are given the same reference symbols as the latter and will not be described below. When no voltage is applied, liquid crystal molecules are aligned approximately perpendicular to the two substrates 32 and 34 by the vertical alignment films (not shown), whereby a black display is obtained in pixel A.

As shown in FIG. 7, in pixel A, the drain voltage $V_d$ of the drain bus line 42 becomes +1 V or −1 V every frame cycle, and the pixel voltage $V_p$ of the pixel electrode 16 is equal to −1 V or +1 V. The common voltage $V_{com}$ of the common electrode 24 is equal to 0 V. Therefore, the potential difference e between the pixel electrode 16 and the drain bus line 42 is approximately equal to 2 V, and the potential difference between the pixel electrode 16 and the common electrode 24 is equal to 1 V. A broken line in FIG. 10 indicates an electric field $E_2$ that develops between the electrodes. No horizontal electric field that is stronger than the electric field between the pixel electrode 16 and the common electrode 24 develops between the pixel electrode 16 and the drain bus line 42.

Figure 11:
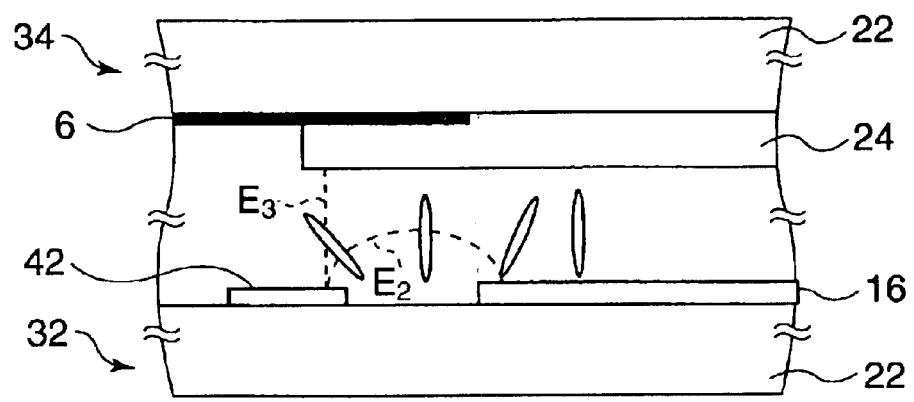

FIG. 11 is a schematic sectional view of an end portion of the pixel electrode 16 of pixel C extending along the drain bus line 42. The components in FIG. 11 having the same functions as the corresponding components in FIG. 4 are given the same reference symbols as the latter and will not be described below. As in the case of pixel A shown in FIG. 10, many of the liquid crystal molecules are aligned approximately perpendicular to the two substrates 32 and 34 by the vertical alignment films, whereby pixel C displays substantially black.

As shown in FIG. 9, in pixel C, the drain voltage $V_d$ of the drain bus line 42 is equal to +5 V or −5 V in most of each frame period, and the pixel voltage $V_p$ of the pixel electrode 16 is equal to +1 V or −1 V. The common voltage $V_{com}$ of the common electrode 24 is equal to 0 V. Therefore, the potential difference e between the pixel electrode 16 and the drain bus line 42 is approximately equal to 6 V, and the potential difference between the pixel electrode 16 and the common electrode 24 is equal to 1 V. The potential difference between the drain bus line 42 and the common electrode 24 is equal to 5 V. Broken lines in FIG. 11 indicate electric fields $E_2$ and $E_3$ that develop between the electrodes. The horizontal electric field $E_2$ that is stronger than the electric field between the pixel electrode 16 and the common electrode 24 develops between the pixel electrode 16 and the drain bus line 42. Also, the strong electric field $E_3$ also develops between the drain bus line 42 and the common electrode 24.

Influenced by the horizontal electric field $E_2$ between the pixel electrode 16 and the drain bus line 42 and the electric field $E_3$ between the drain bus line 42 and the common electrode 24, the liquid crystal molecules over the end portion of the pixel electrode 16 are inclined rightward in FIG. 11. This alignment defect causes light leakage in the end portion of the pixel electrode 16, as a result of which pixel C is displayed brighter than pixel A, whereby vertical crosstalk occurs. This alignment defect occurs in the alignment defective regions 56 shown in FIG. 6.

Figure 12:
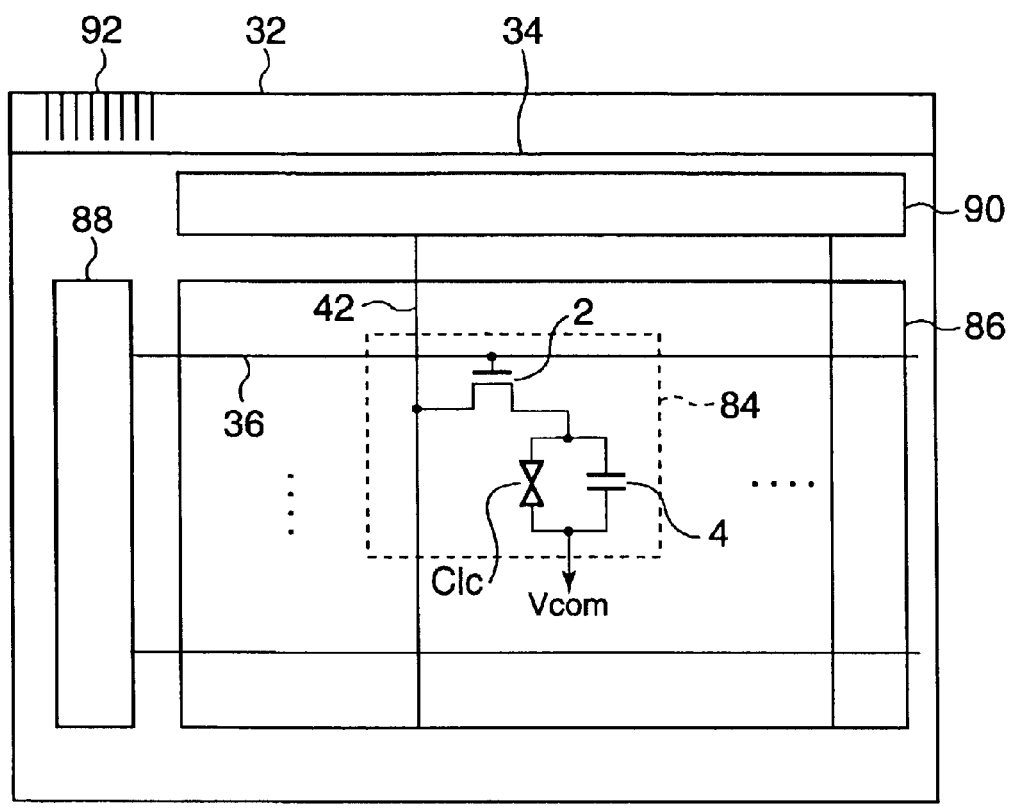
FIG. 12 shows the entire configuration of a liquid crystal display device according to the first embodiment of the invention.
Figure 13:
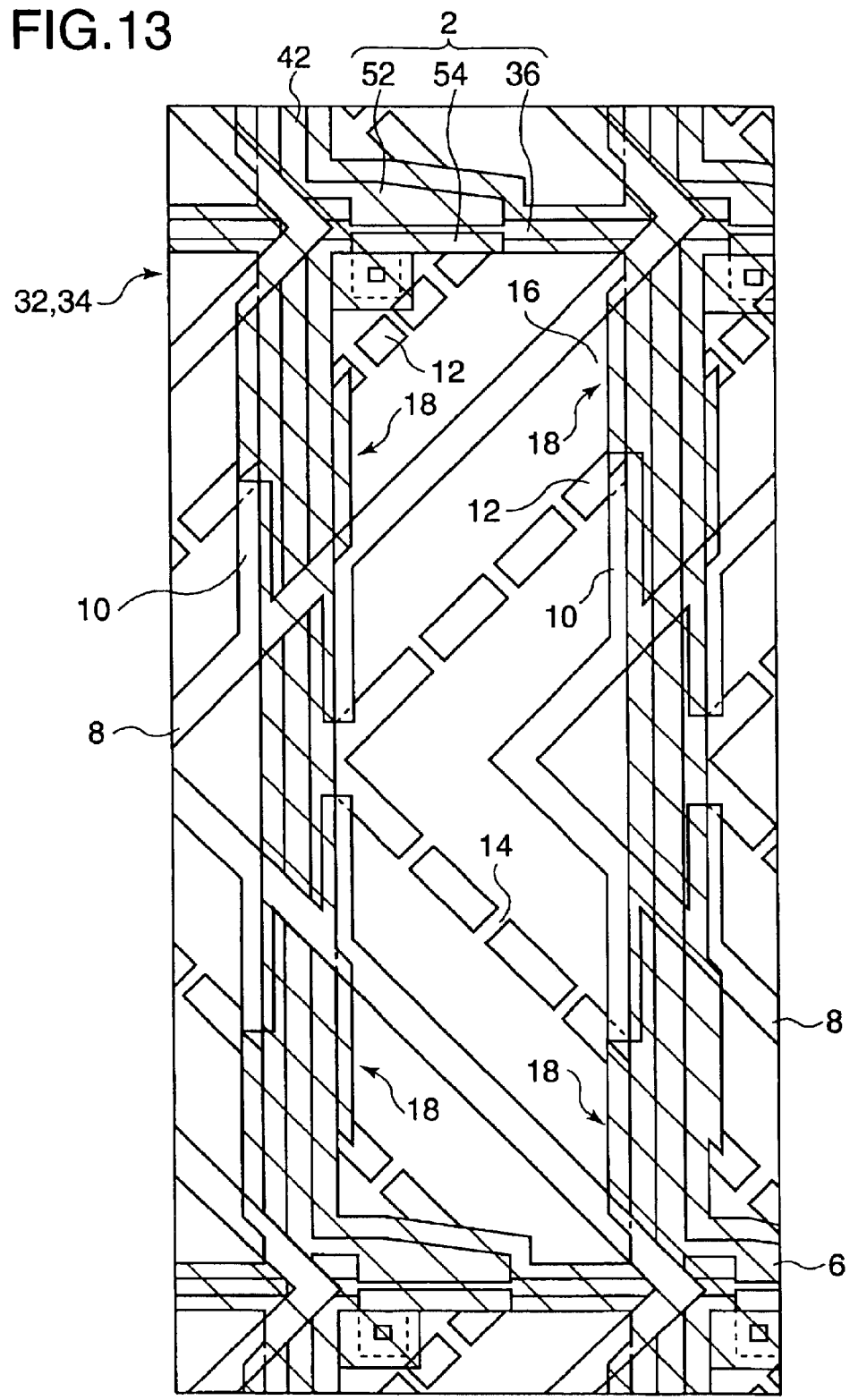
FIG. 13 is a plan view showing a common electrode substrate according to the first embodiment of the invention.

The schematic configuration of a common electrode substrate and a liquid crystal display device having the substrate according to the first embodiment will be outlined with reference to FIGS. 12 and 13. FIG. 12 shows the entire configuration of the liquid crystal display device according to the first embodiment. A display area 86 in which a number of pixel regions 84 each having a TFT 2, a storage capacitor 4, and a pixel electrode that is a transparent conductive film made of, for example, indium tin oxide (ITO) are arranged in a matrix form is defined on an array substrate 32. In FIG. 12, an equivalent circuit corresponding to one pixel of the liquid crystal display device is shown in the pixel region 84. A gate bus line driving circuit 88 is disposed on the left in the surrounding of the display area 86, and a drain bus line driving circuit 90 is disposed in the upper portion of FIG. 12. Input terminals 92 for receiving a dot clock signal, a horizontal synchronous signal (Hsync), a vertical synchronous signal (Vsync), and RGB data from the system side are provided at a panel top portion (see FIG. 12).

The array substrate 32 is opposed to and attached to a common electrode substrate 34 via a sealing agent (not shown). A liquid crystal LC having negative dielectric anisotropy is sealed in a cell gap formed between the array substrate 32 and the common electrode substrate 34. Each pixel electrode on the array substrate 32, the common electrode on the common electrode substrate 34, and the liquid crystal LC interposed therebetween form a liquid crystal capacitor Clc. On the other hand, a display electrode and a storage capacitor bus line that are formed in the array substrate 32 side form a storage capacitor 4.

In the display area 86, a plurality of drain bus lines 42 extending in the top-bottom direction in FIG. 12 are arranged parallel with each other in the right-left direction in FIG. 12. The plurality of drain bus lines 42 are each connected to the drain bus line driving circuit 90, and prescribed gradation voltages are applied to the respective drain bus lines 42.

A plurality of gate bus lines 36 extending in a direction approximately perpendicular to the drain bus lines 42 are arranged parallel with each other in the top-bottom direction in FIG. 12. The plurality of gate bus lines 36 are each connected to the gate bus line driving circuit 88. The gate bus line driving circuit 88 outputs gate pulses sequentially to the plurality of gate bus lines 36 in synchronism with bit outputs that are output from a built-in shift register.

When a gate pulse is output from the gate bus line driving circuit 88 to one of the plurality of gate bus lines 36, the plurality of TFTs 2 connected to the gate bus line 36 are turned on. As a result, gradation voltages being applied from the drain bus line driving circuit 90 to the drain bus lines 42 are applied to the respective pixel electrodes.

FIG. 13 is a plan view showing the configurations of the common electrode substrate and the liquid crystal display device having the substrate according to the first embodiment. FIG. 13 shows one pixel of the liquid crystal display device. The gate bus lines 42 extending in the right-left direction in FIG. 13 and the drain bus lines 36 extending in the top-bottom direction in FIG. 13 are formed on the array substrate 32 that is provided with the TFTs 2. Each TFT 2 is composed of a drain electrode 52 that extends from the drain bus line 42, a source electrode 54 that is arranged opposite to the drain electrode 52, and a portion (gate electrode) of the gate bus line 36 which overlaps with the drain electrode 52 and the source electrode 54. Although not shown in FIG. 13, channel layers that are amorphous silicon (α-Si) films, for example, are formed on the respective gate bus lines 36. The pixel electrodes 16 that are connected to the respective source electrodes 54 are further formed on the array substrate 32. Each pixel electrode 16 is provided with slits 12 that are oblique with respect to the edges of the pixel electrode 16. The slits 12 are alignment regulating structures on the array substrate 32 side for controlling the liquid crystal alignment. Each pixel electrode 16 has connecting portions 14 so as not to be separated electrically by the slits 12, whereby the pixel electrode 16 in each pixel is electrically connected. FIG. 13 does not show a storage capacitor bus line that traverses the pixel at the center.

The common electrode and color filters (both not shown in FIG. 13) are formed on the common electrode substrate 34. A light shield film 6 (indicated by hatching; made of a metal such as Cr) is formed in the regions where the TFTs 2 are formed on the array substrate 32 and other regions where neither the pixel electrodes 16 nor the alignment regulating structures (slits 12 in FIG. 13) are formed. The light shield film 6 is formed in such a manner that the edges approximately coincide with the edges of the pixel electrodes 16 when viewed in the direction perpendicular to the surfaces of the common electrode substrate 34. On the common electrode substrate 34, linear protrusions 8 as alignment regulating structures are formed so as to be oblique with respect to the edges of the pixel electrode 16. Auxiliary protrusions 10 as alignment regulating structures are formed so as to branch off the protrusions 8 and extend along those portions of the drain bus lines 42 which are opposed to end portions of the pixel electrode 16. The light shield film 6 has overlap regions 18 that coextend with those portions of the pixel electrode 16 which extend along the drain bus lines 42 and where the auxiliary protrusions 10 are not formed, when viewed in the direction perpendicular to the surfaces of the common electrode substrate 34. The overlap regions 18 are formed so as to shield from light the alignment defective regions 56 that occur in the regions of the end portions of the pixel electrode 16.

Figure 14:
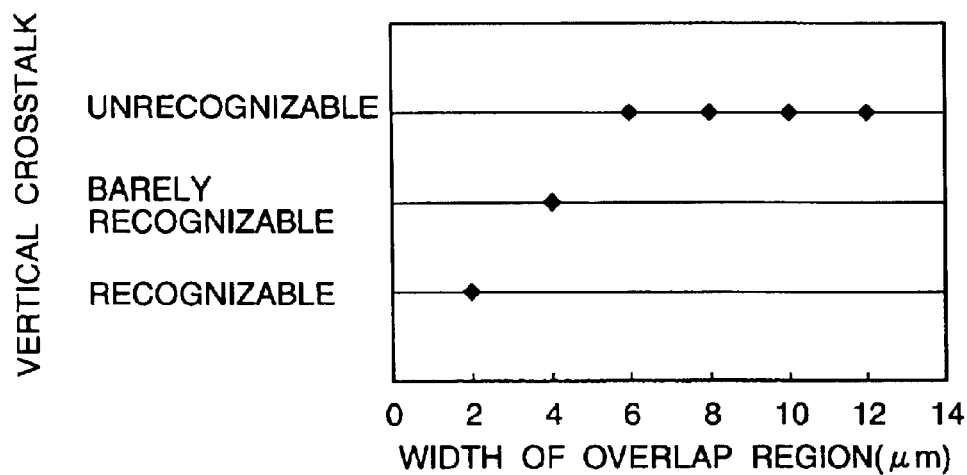
FIG. 14 is a graph showing a relationship between the effect and the overlap width of overlap regions of a light shield film as measured from the end portions of a pixel electrode.

FIG. 14 is a graph showing a relationship between the shield effect and the width of the overlap regions 18 provided on the light shield film 6. The abscissa represents the width (in $\mu$m) of the overlap regions 18, and the ordinate represents the degree of crosstalk in terms of the easiness of recognition of a difference in brightness between pixels C and A shown in FIG. 26 or 27. The width of the overlap regions 18 is the distance between the edges of the overlap regions 18 extending along the direction of the drain bus lines 42 and the edges of the pixel electrodes 16 in the direction of the drain bus lines 42 when viewed in the direction perpendicular to the substrate surface. As shown in FIG. 14, when the width of the overlap regions 18 is 2 $\mu$m or less, a difference in brightness is recognizable, which means occurrence of vertical crosstalk. When the width of the overlap regions 18 is 4 $\mu$m, a difference in brightness is barely recognizable, which means occurrence of vertical crosstalk. When the width of the overlap regions 18 is 6 $\mu$m or more, a difference in brightness is not recognizable, which means absence of vertical crosstalk. Therefore, the vertical crosstalk can be prevented by making the width of the overlap regions 18 greater than or equal to 2 $\mu$m when viewed in the direction perpendicular to the substrate surface, the effect of preventing the vertical crosstalk can be obtained.

Figure 15:
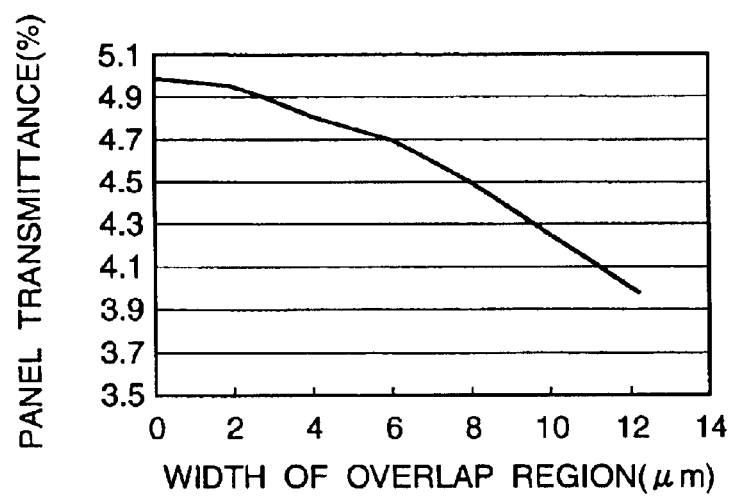
FIG. 15 is a graph showing a relationship between the panel transmittance and the overlap width of the overlap regions of the light shield film as measured from the edges of the pixel electrode.

FIG. 15 is a graph showing a relationship between the panel transmittance and the width of the overlap regions 18 of the light shield film 6. The abscissa represents the width (in $\mu$m) of the overlap regions 18, and the ordinate represents the panel transmittance (in %). As shown in FIG. 15, when the width of the overlap regions 18 is 0 $\mu$m (i.e., no overlap regions 18 exist), the panel transmittance is 5.0%. The panel transmittance decreases as the width of the overlap regions 18 increases. When the width of the overlap regions 18 is 12 $\mu$m, the panel transmittance is 4.0%. Therefore, to secure the panel transmittance of 4.0% or more, the width of the overlap regions 18 should be 12 $\mu$m or less when viewed in the direction perpendicular to the substrate surface.

According to the first embodiment, the vertical crosstalk can be prevented by shielding from light the alignment defective regions 56 with the overlap regions 18 of the light shield film 6.

Figure 16:
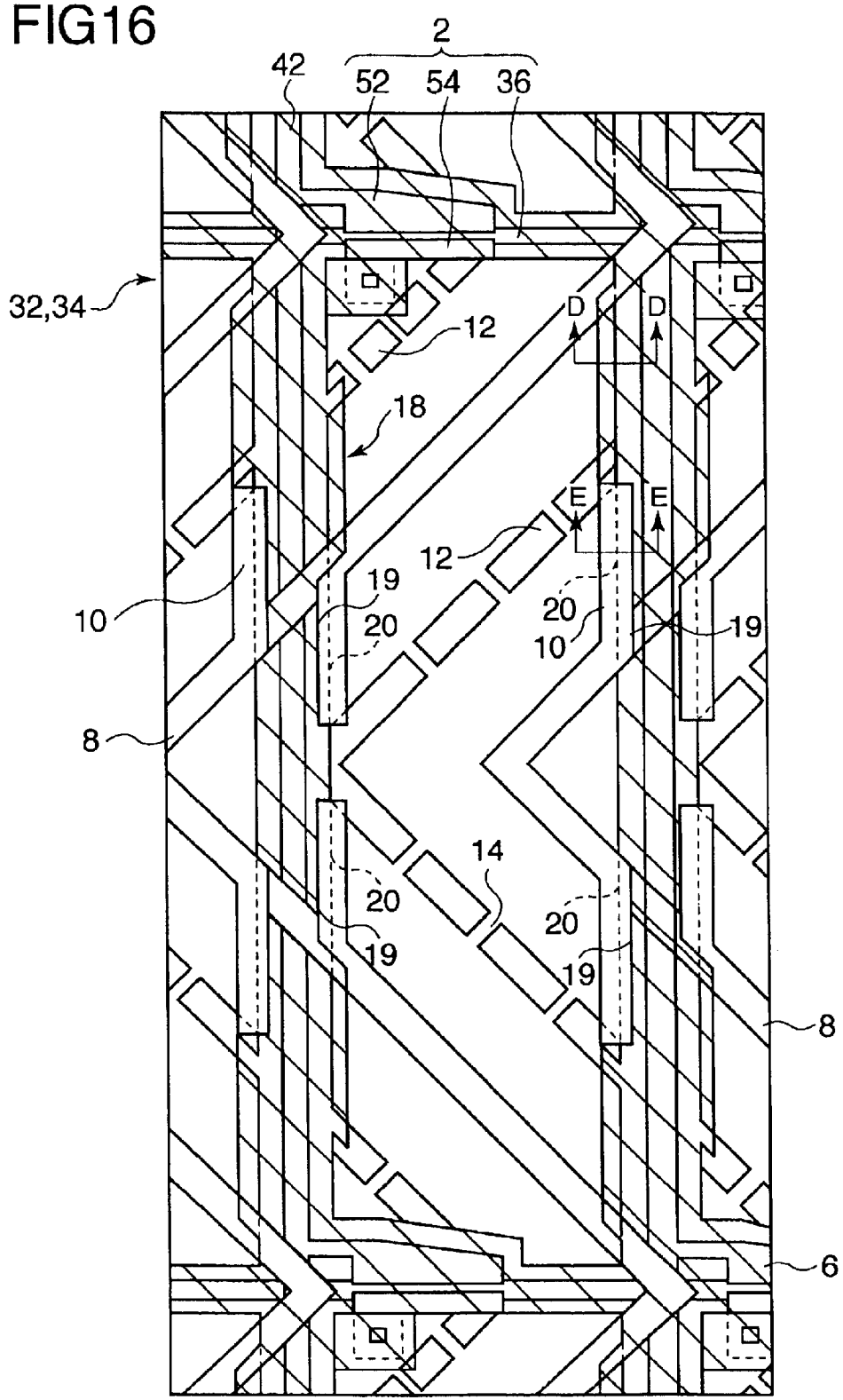
FIG. 16 is a plan view showing a common electrode substrate according to a modification of the first embodiment of the invention.

Next, a common electrode substrate according to a modification of the first embodiment will be described with reference to FIGS. 16 to 18. FIG. 16 is a plan view showing the shape of a light shield film 6 of the common electrode substrate 34 according to the modification of the first embodiment. The components in FIG. 16 having the same functions as the corresponding components in FIG. 13 are given the same reference symbols as the latter and will not be described below. This modification is characterized in that the light shield film 6 is formed outside the pixel electrode 16 when viewed in the direction perpendicular to the surface of the common electrode substrate 34 in the normal alignment regions where the auxiliary protrusions 10 are formed. In FIG. 16, edges 19 of the light shield film 6 in the regions where the auxiliary protrusions 10 are formed are located outside hidden lines representing edges 20 of the pixel electrode that are drawn in the auxiliary protrusions 10.

Figure 17:
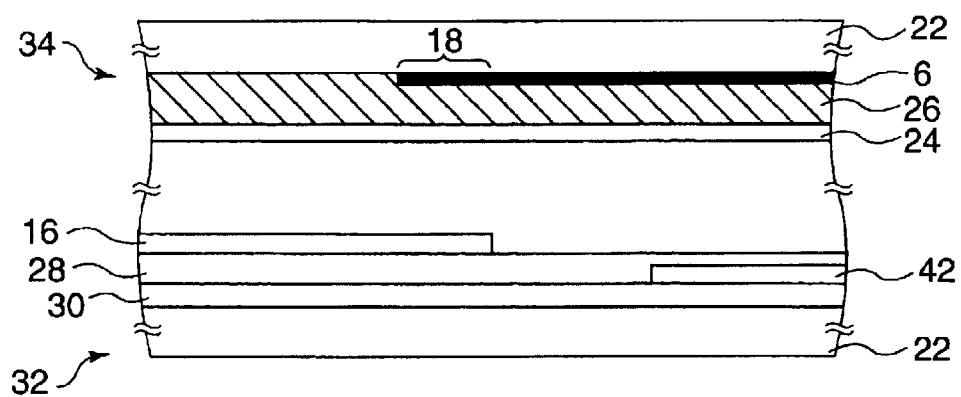
FIGS. 17 and 18 are schematic sectional views showing the common electrode substrate according to the modification of the first embodiment.

FIG. 17 is a schematic sectional view taken along line D—D in FIG. 16. The array substrate 32 has an insulating film 30 that is formed on the glass substrate 22 as a transparent insulating substrate. The drain bus line 42 is formed on the insulating film 30 on the right side in FIG. 17. A protective film 28 is formed over the entire array substrate 32 on the drain bus line 42. The pixel electrode 16 is formed on the protective film 28 on the left side in FIG. 17.

On the other hand, the common electrode substrate 34 that is opposed to the array substrate 32 has the light shield film 6 that is formed on the glass substrate 22. The light shield film 6 has the overlap region 18 that coextends with the right end portion (see FIG. 17) of the pixel electrode 16 when viewed in the direction perpendicular to the surface of the common electrode substrate 34. Color filters 26 are formed on the light shield film 6. The common electrode 24 is formed over the entire common electrode substrate 34 on the color filters 26.

Figure 18:
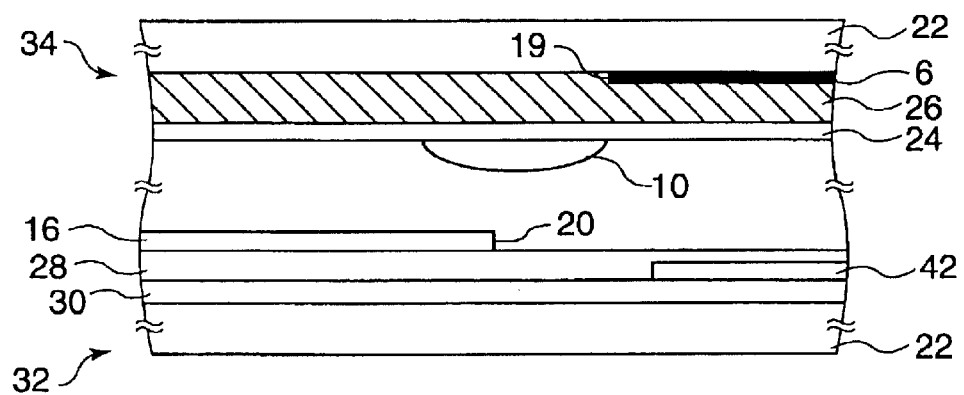

FIG. 18 is a schematic sectional view taken along line E—E in FIG. 16. The components in FIG. 18 having the same functions as the corresponding components in FIG. 17 are given the same reference symbols as the latter and will not described below. FIG. 18 shows a normal alignment region where the auxiliary protrusion 10 is formed on the common electrode 24 at such a position as to be opposed to the end portion of the pixel electrode 16. The light shield film 6 is formed outside the pixel electrode 16 when viewed in the direction perpendicular to the surface of the common electrode substrate 34.

To prevent reflection due to exposure of the surfaces of the drain bus lines 42, it is desirable that the distance between the end portions 19 of the light shield film 6 and the end portions 20 of the pixel electrode 16, when viewed parallel with the surface of the common electrode substrate 34, be smaller than or equal to the distance (e.g., 7 $\mu$m) between the pixel electrode 16 and the drain bus lines 42.

Since the auxiliary protrusions 10 formed on the common electrode substrate 34 strongly restrict the orientation of liquid crystal molecules, no alignment defect occurs in the regions where the auxiliary protrusions 10 are formed. Therefore, the aperture ratio can be increased by aligning the light shield film 6 outside the pixel electrode between when viewed in the direction perpendicular to the surface of the common electrode substrate 34 in the regions where the auxiliary protrusions 10 are formed. Therefore, this modification can provide the same advantage as in the first embodiment, without decreasing the panel transmittance.

Figure 19:
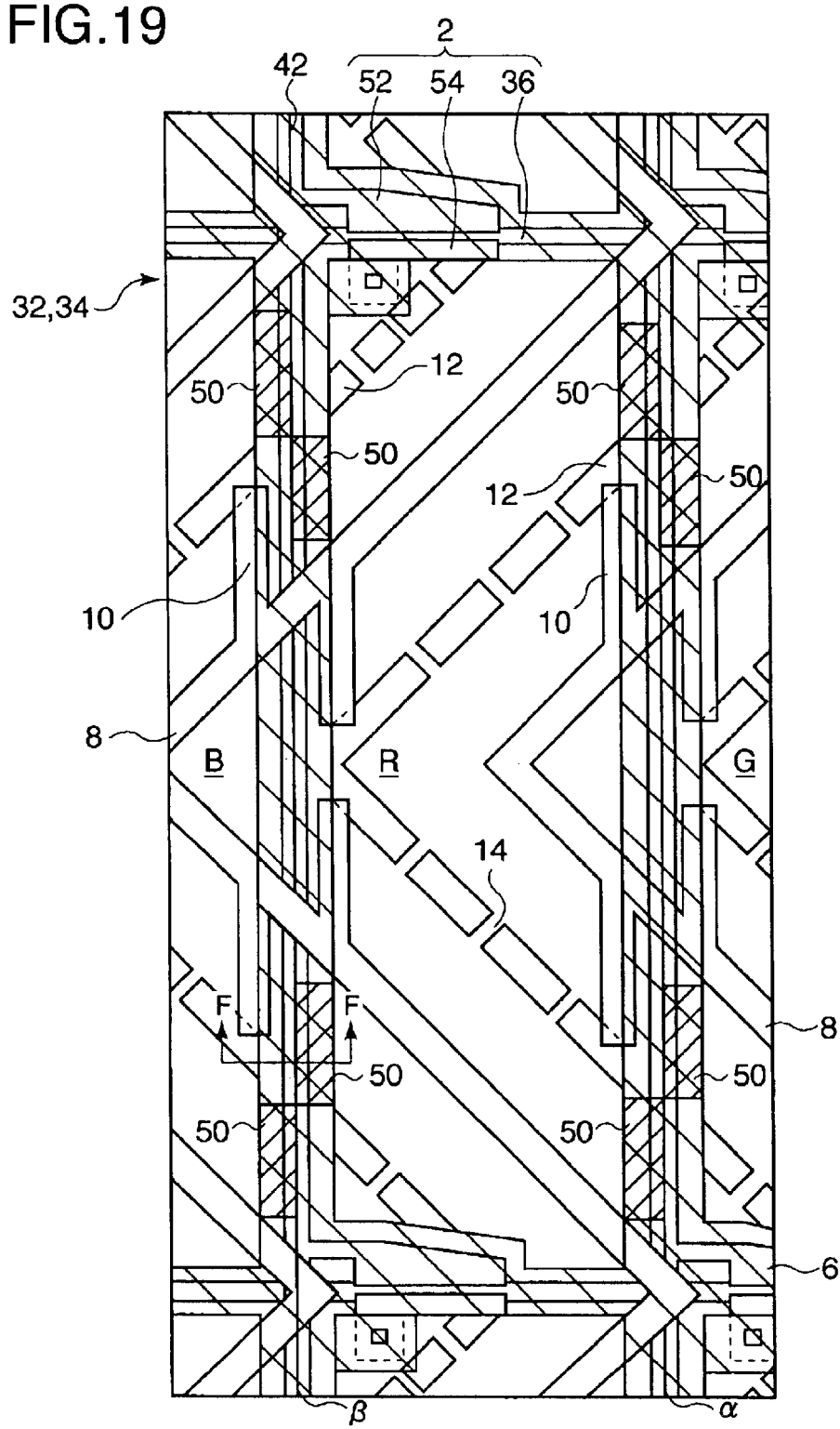
FIG. 19 is a plan view showing a common electrode substrate according to a second embodiment of the invention.

Next, a common electrode substrate and a liquid crystal display device having the substrate according to a second embodiment of the invention will be described with reference to FIGS. 19 and 20. First, the configuration of the common electrode substrate and the liquid crystal display device having it according to the second embodiment will be described with reference to FIG. 19. The entire configuration of the liquid crystal display device is the same as in the first embodiment shown in FIG. 12, and hence, will not be described. FIG. 19 is a plan view showing a one-pixel configuration of the common electrode substrate and the liquid crystal display device having it according to the second embodiment. The components in FIG. 19 having the same functions as the corresponding components in FIG. 13 are given the same reference symbols as the latter and will not be described below.

On the common electrode substrate 34, a red color filter R is formed in the region between straight lines $\alpha$ and $\beta$. A green color filter G is formed in the region on the right of the straight line $\alpha$, and a blue color filter B is formed on the left of the straight line $\beta$ (see FIG. 19). Resin double-layer portions 50 in which two or more layers of color filter forming materials are laminated one on another and that are hence thicker than that part of the color filter which is opposed to the pixel electrode 16 are formed in those parts of the regions opposed to the regions between the drain bus lines 42 and the pixel electrode 16, which exclude the normal alignment regions where the auxiliary protrusions 10 are formed.

Next, the states of liquid crystal molecules in the common electrode substrate and in the liquid crystal display device having the substrate according to the second embodiment will be described with reference to FIG. 20. FIG. 20 is a simplified sectional view taken along line F—F in FIG. 19 and shows pixel in FIG. 26. The drain bus line 42 on the left side is formed on the array substrate 32, and the pixel electrode 16 is formed on the right side on the array substrate 32 (see FIG. 20). On the other hand, on the common electrode substrate 34, the light shield film 6 is formed in the region other than the region that is opposed to the pixel electrode 16. The color filters R and B are formed on the common electrode substrate 34. The color filters B and R are formed in an overlap state in the resin double-layer portion 50, whereby a step is formed in the region that is opposed to the region between the pixel electrode 16 and the drain bus line 42. The common electrode 24 is formed on the color filters R and B and the elevated portion that is formed by the color filters R and B, whereby a conductive protrusion is formed.

Figure 20:
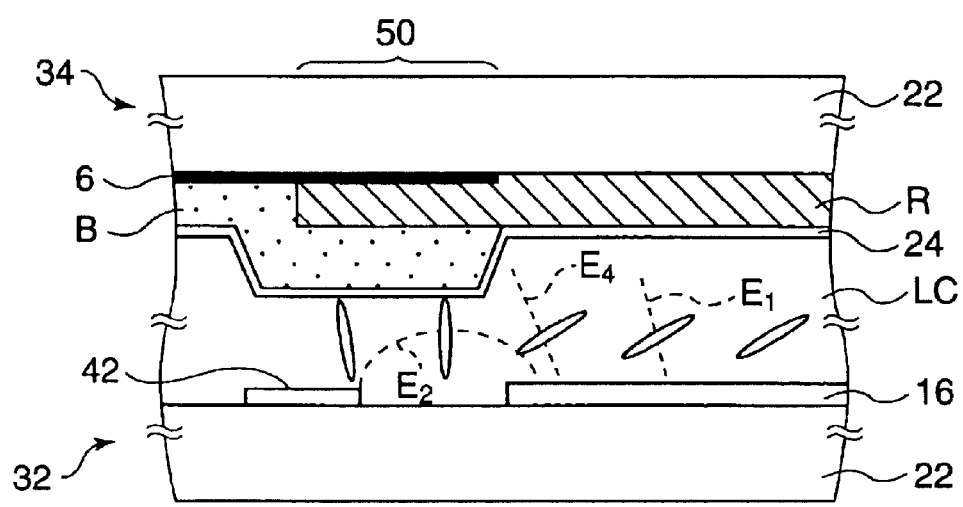
FIG. 20 is a schematic sectional view showing the common electrode substrate according to the second embodiment of the invention.
Figure 21:
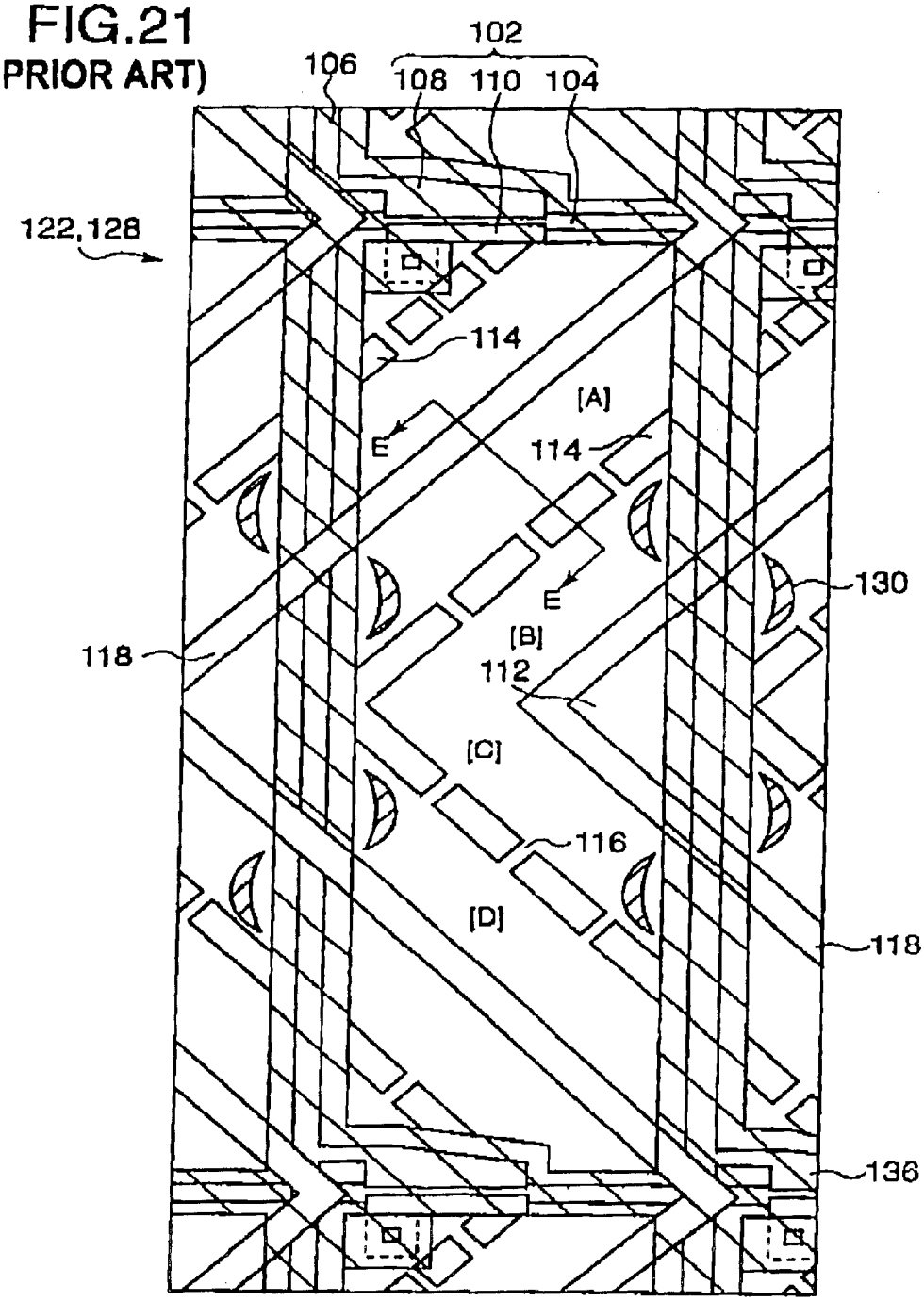
FIG. 21 is a plan view showing the configuration of a conventional liquid crystal display device.
Figure 22:
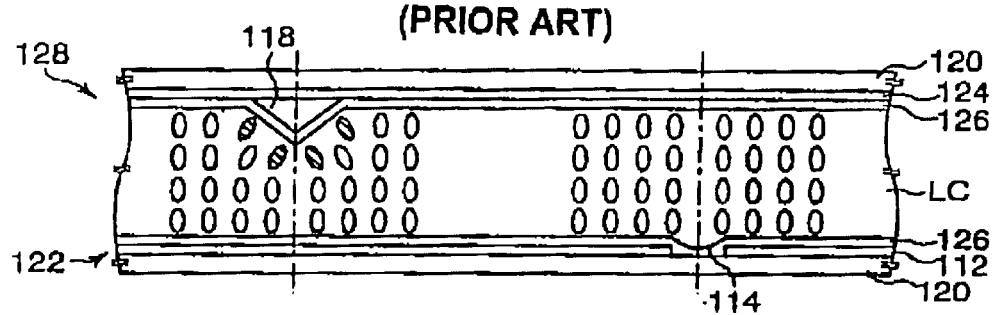
FIGS. 22 to 24 are schematic sectional views showing the configuration of the conventional liquid crystal display device of FIG. 21.
Figure 23:
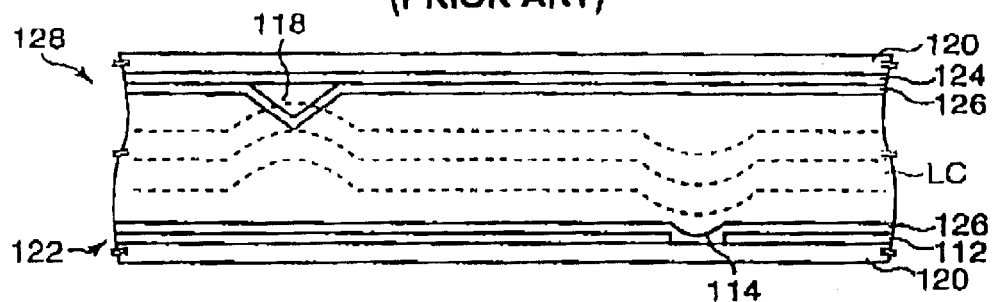
Figure 24:
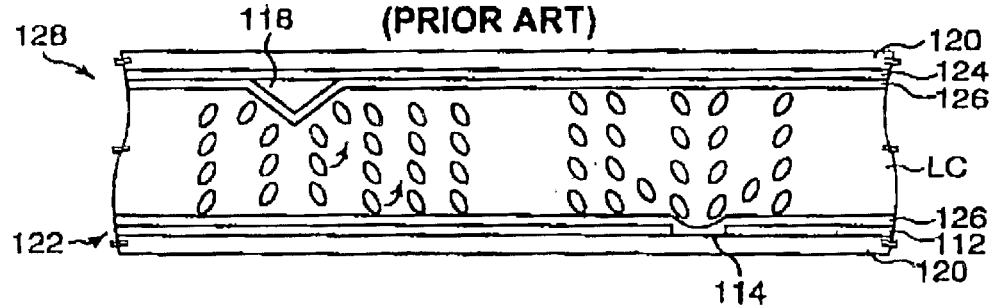

Broken lines in FIG. 20 indicate electric fields $E_1$, $E_2$, and $E_4$ that develop between the electrodes. Influenced by the step of the common electrode 24, the strong, oblique electric field $E_4$ develops in the vicinity of the end portion of the pixel electrode 16. Therefore, liquid crystal molecules in the vicinity of the end portion of the pixel electrode 16 are inclined rightward in FIG. 20 unlike the corresponding liquid crystal molecules shown in FIG. 5, and are aligned in the same manner as the liquid crystal molecules in the vicinity of the end portion of the pixel electrode 16 of pixel A shown in FIG. 4.

According to the second embodiment, liquid crystal molecules in the vicinity of the end portions of the pixel electrode 16 can be alignment-restricted by the strong, oblique electric fields that develop due to the influence by the steps formed in the regions opposed to the regions between the pixel electrode 16 and the drain bus line 42. Therefore, the vertical crosstalk that would otherwise occur due to the presence of the alignment defective regions 56 occurring in the regions of the end portions of the pixel electrode 16 can be prevented. Since the areas of the alignment defective regions 56 decrease, the overlap width of the overlap regions 18 can be decreased, and hence, the panel transmittance can be increased.

The invention is not limited to the above embodiments and various modifications are possible.

In the first embodiment, the light shield film 6 has the overlap regions 18. And, in the modification of the first embodiment, the light shield film 6 has the overlap regions 18, and the light shield film 6 is formed outside the drain bus lines 42 between in the regions where the auxiliary protrusions 10 are formed. However, the invention is not limited to those cases. For example, only the measure of forming the light shield film 6 outside the drain bus lines 42 in between in the regions where the auxiliary protrusions 10 are formed may be taken. Since no liquid crystal alignment defect occurs in the regions where the auxiliary protrusions 10 are formed, the panel transmittance can be increased without deteriorating the vertical crosstalk.

In the second embodiment, the steps, that is, the resin double-layer portions 50 are formed by laminating color filter forming materials one on another. However, the invention is not limited to such a case. Steps may be formed by using another resin such as a black resin.

Although in the above embodiments, the light shield film 6 is made of a metal such as Cr, the invention is not limited to such a case. The light shield film 6 may be formed by laminating the color filter forming materials one on another.

As described above, the invention can realize a common electrode substrate capable of providing high luminance and good display characteristics as well as a liquid crystal display device having such a common electrode substrate.

What is claimed is:

1. A common electrode substrate comprising:
   a transparent insulating substrate to be arranged opposite to an array substrate having pixel electrodes formed in respective pixel regions that are defined by a plurality of gate bus lines and drain bus lines, and to hold a liquid crystal having negative dielectric anisotropy;
   a common electrode formed on the transparent insulating substrate;
   alignment regulating structures having linear protrusions formed on the common electrode; and
   a light shield film formed on the transparent insulating substrate and having overlap regions that overlap the pixel electrodes when viewed in a direction perpendicular to a surface of the transparent insulating substrate so as to shield, from light, alignment defective regions of the liquid crystal formed in regions of end portions of the pixel electrodes.

2. The common electrode substrate according to claim 1, wherein the light shield film has the overlap regions extending along the drain bus lines, when viewed in the direction perpendicular to the surface of the transparent insulating substrate.

3. The common electrode substrate according to claim 2, wherein a width of the overlap regions is greater than or equal to 2 $\mu$m and smaller than or equal to 12 $\mu$m when viewed in the direction perpendicular to the surface of the transparent insulating substrate.

4. The common electrode substrate according to claim 1, wherein:
   the alignment regulating structures further have auxiliary protrusions that branch off the linear protrusions and extend along portions of the drain bus lines that are opposed to end portions of the pixel electrodes; and
   the light shield film has the overlap regions in regions where the auxiliary protrusions are not formed, when viewed in the direction perpendicular to the surface of the transparent insulating substrate.

5. The common electrode substrate according to claim 1, wherein the light shield film is formed outside each of the pixel electrodes in normal alignment regions other than the alignment defective regions of the liquid crystal, when viewed in the direction perpendicular to the surface of the transparent insulating substrate.

6. The common electrode substrate according to claim 5, wherein the light shield film is formed outside each of the pixel electrodes so as to extend along the drain bus lines, when viewed in the direction perpendicular to the surface of the transparent insulating substrate.

7. The common electrode substrate according to claim 6, wherein a distance between end portions of the light shield film and end portions of each of the pixel electrodes in the normal alignment regions of the liquid crystal is smaller than or equal to 7 $\mu$m, when viewed parallel with the surface of the transparent insulating substrate.

8. The common electrode substrate according to claim 5, wherein:
   the alignment regulating structures further have auxiliary protrusions that branch off the protrusions and extend along portions of the drain bus lines that are opposed to end portions of the pixel electrodes; and
   the light shield film is formed outside each of the pixel electrodes in regions where the auxiliary protrusions are formed when viewed in the direction perpendicular to the surface of the transparent insulating substrate.

9. A common electrode substrate comprising:
   a transparent insulating substrate to be arranged opposite to an array substrate having pixel electrodes formed in respective pixel regions that are defined by a plurality of gate bus lines and drain bus lines, and to hold a liquid crystal having negative dielectric anisotropy;
   a common electrode formed on the transparent insulating substrate;
   alignment regulating structures having linear protrusions formed on the common electrode; and
   a light shield film formed on the transparent insulating substrate outside each of the pixel electrodes in normal alignment regions other than alignment defective regions of the liquid crystal when viewed in a direction perpendicular to a surface of the transparent insulating substrate.

10. The common electrode substrate according to claim 9, wherein the light shield film is formed outside each of the pixel electrodes so as to extend along the drain bus lines when viewed in the direction perpendicular to the surface of the transparent insulating substrate.

11. The common electrode substrate according to claim 9, wherein:
   the alignment regulating structures further have auxiliary protrusions that branch off the linear protrusions and extend along portions of the drain bus lines that are opposed to end portions of the pixel electrodes; and
   the light shield film is formed outside each of the pixel electrodes in regions where the auxiliary protrusions are formed when viewed in the direction perpendicular to the surface of the transparent insulating substrate.

12. The common electrode substrate according to claim 1, wherein the light shield film is formed by laminating, one on another, forming materials of color filters that are formed in the respective pixel regions.

13. A common electrode substrate comprising:
   a transparent insulating substrate to be arranged opposite to an array substrate having pixel electrodes formed in respective pixel regions that are defined by a plurality of gate bus lines and drain bus lines, and to hold a liquid crystal having negative dielectric anisotropy;

a common electrode formed on the transparent insulating substrate and having steps for alignment-restricting the liquid crystal in regions opposed to regions between each of the pixel electrodes and the drain bus lines; and alignment regulating structures having linear protrusions formed on the common electrode.

14. The common electrode substrate according to claim 13, wherein the steps are formed thicker than the regions that are opposed to the respective pixel electrodes.

15. The common electrode substrate according to claim 13, wherein:

the alignment regulating structures further have auxiliary protrusions that branch off the linear protrusions and extend along portions of the drain bus lines that are opposed to end portions of the pixel electrodes; and the steps are formed in regions where the auxiliary protrusions are not formed.

16. The common electrode substrate according to claim 13, wherein each of the steps is formed in such a manner that a resin is formed under the common electrode.

17. The common electrode substrate according to claim 16, wherein each of the steps is formed in such a manner that forming materials of color filters formed in the respective pixel regions are laminated one on another.

18. The common electrode substrate according to claim 16, wherein each of the steps is made of a black resin.

19. The common electrode substrate according to claim 1, wherein the linear protrusions are formed obliquely with respect to edges of the pixel electrodes.

20. A liquid crystal display device comprising an array substrate having pixel electrodes formed in respective pixel regions that are defined by a plurality of gate bus lines and drain bus lines, an opposite substrate arranged opposite to the array substrate, and a liquid crystal having negative dielectric anisotropy sealed between the array substrate and the opposite substrate;

wherein the opposite substrate is the common electrode substrate as set forth in claim 1.

* * * * *